(12) United States Patent
Okamoto et al.

(10) Patent No.: US 7,168,737 B2
(45) Date of Patent: *Jan. 30, 2007

(54) INTEGRATED CIRCUIT FOR AIR BAG SYSTEM

(75) Inventors: Mitsuyasu Okamoto, Himeji (JP); Shingo Oda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 164 days.

This patent is subject to a terminal disclaimer.

(21) Appl. No.: 10/350,006

(22) Filed: Jan. 24, 2003

(65) Prior Publication Data

US 2004/0084882 A1    May 6, 2004

Related U.S. Application Data

(60) Provisional application No. 60/359,993, filed on Feb. 28, 2002.

(30) Foreign Application Priority Data

Jan. 25, 2002  (JP) .............................. 2002-016326
Feb. 15, 2002  (JP) .............................. 2002-038680

(51) Int. Cl.
  *B60R 21/01*  (2006.01)
(52) U.S. Cl. ................ 280/735; 102/202.2; 102/202.5; 102/215; 102/218; 307/10.1
(58) Field of Classification Search ................ 280/735, 280/741; 102/202.2, 202.5, 202.7, 202.9, 102/215, 218; 307/10.1
  See application file for complete search history.

(56) References Cited

U.S. PATENT DOCUMENTS

| | | | | |
|---|---|---|---|---|
| 4,819,560 A | | 4/1989 | Patz et al. | |
| 5,882,034 A | * | 3/1999 | Davis et al. | 280/735 |
| 5,899,949 A | * | 5/1999 | Kincaid | 280/735 |
| 6,166,451 A | * | 12/2000 | Pigott | 307/10.1 |
| 6,286,862 B1 | * | 9/2001 | Blank et al. | 280/735 |
| 6,302,024 B1 | * | 10/2001 | Swart et al. | 102/202.5 |
| 6,324,979 B1 | * | 12/2001 | Troianello | 102/202.7 |

(Continued)

FOREIGN PATENT DOCUMENTS

JP    2707250 B2    10/1997

(Continued)

OTHER PUBLICATIONS

Munger, A.C., "Electrothermal Response Testing, A Component Development Tool," Seventh International Pryotechnics Seminar, Jul. 1980, pp. 461-478, vol. 1, IIT Research Institute, Vail, Colorado.

*Primary Examiner*—Ruth Ilan
(74) *Attorney, Agent, or Firm*—Birch, Stewart, Kolasch & Birch, LLP

(57) ABSTRACT

An integrated circuit for an air bag system is used in an air bag system having an ECU and a module case connected to the ECU and accommodating a gas generator and an air bag. In the air bag system, two bus lines passing through the ECU are provided to supply currents and the like, and individual gas generators accommodated in the module cases are connected operationally by conductors branched from the bus lines. Each of the igniters incorporated in the gas generator is an electric igniter which is provided with a heat generating portion and a priming coming in contact with the heat generating portion, and the igniter and the bus line are connected to each other through the conductors, and the integrated circuit provided in the igniter is recorded with information to exhibit required functions, and a current for igniting the priming is supplied to the igniters through a capacitor.

20 Claims, 14 Drawing Sheets

U.S. PATENT DOCUMENTS 6,332,399 B1 * 12/2001 Laucht et al. ............ 102/202.5
6,418,853 B1    7/2002 Duguet et al.
6,530,597 B1 * 3/2003 Nesper et al. ............. 280/735
6,820,557 B2 * 11/2004 Okamoto et al. .......... 102/218
6,979,020 B2 * 12/2005 Okamoto et al. .......... 280/735

FOREIGN PATENT DOCUMENTS

| | | |
|---|---|---|
| JP | 2000-241098 A | 9/2000 |
| JP | 2000-513799 A | 10/2000 |
| JP | 2001-171475 A | 6/2001 |
| WO | WP 98/36949 A1 | 8/1998 |
| WO | WO 00/43727 A1 | 7/2000 |

* cited by examiner

INTEGRATED CIRCUIT FOR AIR BAG SYSTEM

This nonprovisional application claims priority under 35 U.S.C. § 119(e) on U.S. Provisional Application Nos. 60/359,993 filed on Feb. 28, 2002 and under 35 U.S.C. § 119 (a) on Patent Application Nos. 2002-16326 and 2002-38680 filed in Japan on Jan. 25, 2002 and Feb. 15, 2002, which are herein incorporated by reference.

BACKGROUND OF THE INVENTION

1. Field of the Invention

The present invention relates to an integrated circuit for an air bag system utilizing a bus system and a method for controlling operation of an air bag system using the same.

2. Description of Related Art

An airbag system for protecting a passenger from an impact at a time of a collision of a vehicle is indispensable, and the air bag system needs to be reduced in weight from a demand for reducing weight of n entire vehicle. Recently, types and total number of air bags such as an air bag for a driver side, an air bag for a passenger side next to the driver, an air bag for a rear seat side, and an air bag for a side impact are increasing, and therefore, a lighter air bag system is in greater demand.

In a current air bag system, an electronic control unit (ECU) connected to a power source (a battery installed in a vehicle) and an impact detecting sensor are individually connected to individual gas generators (a gas generator and an air bag are accommodated in a module case M as shown in FIG. 13). An aspect of the connection between the ECU and the individual gas generators is shown in FIG. 13.

As shown in FIG. 13, the ECU and an igniter (141 as shown in FIG. 14) of each of the individual gas generators are necessarily connected to each other through two conductors, and thereby, conductors double the number of the total number of igniters are required. Having many conductors contributes largely to weight increase in an air bag system. In view of constraints at a time of assembling vehicle parts, the ECU and the individual gas generators are not connected by only the conductors but connected by connecting a plurality of conductors via a plurality of connectors, and thereby, there occurs a serious problem such as a weight increase due to use of the connectors and a cost increase due to increase of the number of the connectors. Further, increase in volume (weight) of the ECU due to increase in volume of a capacitor incorporated into the ECU as a backup power source for activating all the igniters (serving at a time of a disconnection between the power source and the ECU) is another serious problem.

In view of the above, a trial for reducing a conductor weight required for connection between the ECU and the individual gas generators by utilizing a bus system in the air bag system has been examined.

An air bag system is constituted by providing bus lines comprising a plurality of loop wires passing through the ECU and connecting each of the individual gas generators to the bus line through two conductors (three or more conductors when occasion demands). In a case of such an air bag system, since only gas generators required corresponding to a collision situation of a vehicle are activated, an integrated circuit receiving information transmission from the ECU and a capacitor supplying a current for activating an igniter are provided in each of the individual gas generators. In the case of utilizing a bus system, the total number of capacitors is increased, but since the capacitors are distributed and arranged in the ECU and the respective igniters, the capacitance and weight of the capacitor per igniter is reduced. As a result, since the weight of the capacitors in this case is remarkably reduced as compared with the weight of the capacitors for backup in the air bag system shown in FIG. 13, a large weight reduction is achieved as the system as a whole in addition to largely reducing the amount of use of conductor, which is expected to be put in a practical use in the air bag system. Incidentally, there have been known JP2000-241098A, JP2000-513799A, and Japanese Patent No. 2707250 as the prior art utilizing the bus system.

SUMMARY OF THE INVENTION

An object of the present invention is to provide an integrated circuit for an air bag system which achieves a large weight reduction in an entire air bag system by introducing a bus system into the air bag system, and which can ensure reliability and rapidness of operation similar to those in a conventional art, and which can obtain a high reliability, and an operation control method of an air bag system utilizing the same.

An invention provides, as one means for solving the above problem, an integrated circuit, for an air bag system, provided inside at least one igniter incorporated in a plurality of gas generators and used in an air bag system, comprising: an electronic control unit connected to a power source and an impact detecting sensor and a plurality of module cases connected to the electronic control unit and accommodating the plurality of gas generators and a plurality of air bags, wherein, in the air bag system, a bus line comprising a plurality of loop wires which pass through the electronic control unit is provided to supply and transmit currents and required information, and individual gas generators accommodated in the plurality of module cases are connected operationally by a plurality of conductors branched at predetermined portions from the bus line, the at least one igniter incorporated in the gas generator is an electric igniter provided with a heat generating portion and a priming in contact with the heat generating portion, and the igniter and the bus line are connected to each other through plurality conductors, and the integrated circuit provided in the igniter is recorded with information to exhibit required functions, and a current for igniting the priming is supplied to the at least one igniter through a capacitor.

In the above invention, it is preferable that the integrated circuit has a circuit having a function for detecting abnormality of the heat generating portion of the igniter in the gas generator, a circuit having a function for identifying each of the plurality of gas generators, and a circuit having a function for detecting a malfunction of the capacitor. A basic function of the integrated circuit is to receive a signal from the ECU in response to a situation occurring when a vehicle has collided and to activate a gas generator for properly protecting a passenger. In addition thereto, by providing the various functions described above, quality check of a product at a time of shipping and workability at a time of assembling are properly improved, and safety at an actual use (while driving a vehicle) and the like can be also properly improved.

The invention provides, as one means for solving the above problem, an integrated circuit, for an air bag system, which is provided in at least one igniter incorporated into a plurality of gas generators and used in an air bag system; comprising: an electronic control unit connected to a power source and an impact detecting sensor; and a plurality of module cases connected to the electronic control unit and accommodating the plurality of gas generators and a plurality of air bags, wherein in the air bag system, a bus line including a plurality of loop wires which pass through the electronic control unit is provided to supply and transmit currents and required information, and individual gas generators accommodated in the plurality of module cases are connected operationally by a plurality of conductors branched at predetermined portions from the bus line, the at least one igniter incorporated in the gas generator is each electric igniter provided with a heat generating portion and a priming in contact with the heat generating portion, and the igniter and the bus line are connected to each other through the plurality of conductors, and the integrated circuit provided inside the igniter has a circuit having a function to detect abnormality of the heat generating portion of the igniter, and the abnormality of the igniter to be detected includes at least one of the group including disconnection, a loose contact between the heat generating portion and the priming, or abnormality of a resistance value of the heat generating portion.

In the present invention, the loose contact between the heat generating portion of the igniter and the priming is to be detected by detecting a change in the resistance value due to a temperature change of the heat generating portion as a voltage change.

The invention described in claim 5 provides, as one means for solving the above problem, an integrated circuit for an air bag system provided in at least one igniter incorporated into a plurality of gas generators and used in an airbag system, comprising: an electronic control unit connected to a power source and an impact detecting sensor; and a plurality of module cases connected to the electronic control unit and accommodating the plurality of gas generators and a plurality of air bags, wherein in the air bag system, a bus line including a plurality of loop wires which pass through the electronic control unit is provided to supply and transmit currents and required information, and individual gas generators accommodated in the plurality of module cases are connected operationally by a plurality of conductors branched at predetermined portions from the bus line, the at least one igniter incorporated in the gas generator is each electric igniter provided with a heat generating portion and a priming in contact with the heat generating portion, and the igniter and the bus line are connected to each other through the plurality of conductors, and the integrated circuit provided inside the igniter has a function to identify each of the plurality of gas generators.

In the above invention, preferably, the information to exhibit a function for identifying each of the plurality of gas generators is recorded after assembling the gas generator.

Further in the above invention, preferably, the information to exhibit a function for identifying each of the plurality of gas generators is recorded after assembling the gas generator in the module case or after mounting into a vehicle.

The invention provides, as one means for solving the above problem, an integrated circuit for an air bag system provided in at least one igniter incorporated into a plurality of gas generators and used in an air bag system, comprising: an electronic control unit connected to a power source and an impact detecting sensor; and a plurality of module cases connected to the electronic control unit and accommodating the plurality of gas generators and a plurality of air bags, wherein in the air bag system, a bus line including a plurality of loop wires which pass through the electronic control unit is provided to supply and transmit currents and required information, and individual gas generators accommodated in the plurality of module cases are connected operationally by a plurality of conductors branched at predetermined portions from the bus line, the at least one igniter incorporated in the gas generator is each electric igniter provided with a heat generating portion and a priming in contact with the heat generating portion, and the igniter and the bus line are connected to each other through the plurality of conductors, and the integrated circuit provided inside the igniter has a function to detect a malfunction of the capacitor storing power to supply to the heat generating portion provided in the igniter.

In the above invention, preferably, the information to exhibit a function for detecting a malfunction of the capacitor is information for measuring a pulse response or a dielectric dissipation factor.

In each of the above inventions, the numbers of the loop wires forming the bus line and the conductors for connecting the bus line and the gas generators may be two, three, or four or more, respectively, but, in view of simplification of the entire system, two is preferable.

The priming is not limited to a specific one, but a combination of a metal or the like and an oxidizing agent such as perchlorate is preferable, a combination of a metal such as zirconium, titanium, and hafnium and perchlorate is more preferable, and a mixture (ZPP) of zirconium and potassium perchlorate is particularly preferable. Desirably, the ZPP is formed in particle shape and particle diameters of zirconium and potassium perchlorate are adjusted.

A capacitance of the capacitor is preferably not more than 24 µF, more preferably not more than 12 µF, further more preferably not more than 6 µF.

In each invention described above, the details of the circuit having the function for detecting abnormality of the heat generating portion of the igniter in the gas generator, the circuit having the function for identifying each of the plural gas generators, and the circuit having the function for detecting a malfunction of the capacitor are described in the following items (i) to (iii).

(i) The circuit having the function for detecting abnormality (disconnection or contact failure between the heat generating portion and the priming, or abnormality of a resistance value of the heat generating portion) of the heat generating portion of the igniter in the gas generator:

As one of conditions required for the gas generator to activate normally, a contacting state between the heat generating portion of the igniter and the priming has to be good (the heat generating portion and the priming has to be brought in press-contact with each other). For example, when there is a gap between the heat generating portion and the priming, it is considered that there occurs a malfunction such that the priming may not be ignited when the igniter is actuated or an ignition is delayed. Further, when the heat generating portion is disconnected or have been half-disconnected, a similar malfunction occurs. For this reason, by recording information for detecting the malfunction in the integrated circuit, an inferior product can be removed at a time of shipping, and by detecting abnormality at a practical use (while driving a vehicle), a prompt exchange can be performed.

Detecting theory for abnormality of the heat generating portion (Thermal Transient Test; issued on pages 461 to 478 in "Progress of International Pyrotechnic Seminar" on July 1980 by A. C. Munger) is as follows: when contacting state of a heat generating portion and a priming is good, most of the heat generated by flowing of a constant current is conducted to the priming, so that the temperature of the heat generating portion does not rise so high. On the other hand, when the contacting state of the heat generating portion and the priming is bad, transfer of heat is less, so that the temperature rising of the heat generating portion becomes higher than in a normal case. Therefore, a malfunction is detected by detecting a temperature change due to such a difference in contacting state as a resistance value change and utilizing a temperature coefficient of metal resistance [$r=r0 (1+\alpha\Delta T)$] to obtain the temperature of the heat generating portion. More specifically, after a resistance r is measured when a current i which is too weak to raise the temperature up to igniting the igniter, a resistance R is measured when a current I of 10 to 15 times of the current i is flowed (the temperature of the heat generating portion becomes about 50 to 100° C., but the priming is not ignited with such a temperature), so that the resistance change due to the temperature change of the heat generating portion is obtained as a voltage change with comparisons of I and i and of R and r. Thus, such measurement information is recorded in the integrated circuit.

(ii) The function for identifying each gas generator among a plurality of gas generators:

For the gas generator for an air bag, various kinds of gas generators such as one for a driver side, one for a passenger side, one for a side impact (for a side collision), one for a curtain air bag and the like have been practically used. For example, in the case of the gas generator for a side impact, the total four gas generators are mounted for a driver side, a passenger side two rear seat sides respectively. For this reason, though different information pieces are recorded in the respective integrated circuits of the gas generators for the driver side, for the passenger side next to the driver, and for two rear seat sides, when these information pieces are recorded at a time of assembling the igniters or the gas generators or before assembling, since the igniters or the gas generators have the same appearance, it is necessary to distinguish the gas generators having the same appearance and having different information pieces recorded or the igniters having the same appearance before assembling such that a wrong gas generator is not taken to store and to transport them, which becomes much complicated. Furthermore, if a gas generator for a driver side is mistakenly mounted to a vehicle as a gas generator for a passenger side, when activation information of an air bag for a driver side is sent from the ECU, an erroneous activation of an air bag for the passenger side would occur.

Therefore, by recording information for identifying each of the plurality of gas generators after one of assembling of gas generators (when differences of gas generators can be recognized apparently), after gas generators are assembled in module cases (when differences of module cases can be recognized apparently) and after gas generators are mounted to a vehicle, storage, transportation, management and the like of gas generators can be made easy, so that mistake or confusion is prevented from occurring at a time of mounting of gas generators.

It is preferable that the information for identifying a function for each gas generator among the plurality of gas generators are recorded after assembling the gas generators. It is more preferable that the information pieces are recorded after the gas generators are assembled in the module cases, and it is further preferable that the information pieces are recorded after the module cases are mounted to a vehicle.

(iii) The function for detecting a malfunction of the capacitor:

The information necessary for detecting a malfunction of the capacitor also includes confirmation information of a mounted state (soldered state) of a capacitor to a substrate and the like in addition to information for measuring a pulse response or a dielectric dissipation factor.

After mounted to the vehicle, since the capacitor repeats charging and discharging, the capacitor deteriorates with age. However, abnormality is detected at a time of an actual use (while driving a vehicle) by recording information which can determine a malfunction due to this deterioration in the integrated circuit in advance, so that a prompt exchange can be performed. Furthermore, by recording information for confirming the soldered state in advance, an inferior product can be removed at a time of shipping.

In each of the above inventions, it is preferable that the integrated circuit has a circuit for preventing the igniter from being activated erroneously by a noise from outside the igniter (a noise countermeasure circuit).

For example, when a large current flows at a time of activating a cell motor in a vehicle, a noise preventing circuit is not provided, there is a possibility that a noise (a noise causing an uncomfortable unusual sound occurrence while listening to the radio) generated due to this current is transmitted from a vehicle body to flow into an igniter. Due to the noise being transmitted in this manner, a possibility that an igniter causes an erroneous activation becomes high. Accordingly, by mounting a device constituted to prevent a current from flowing from a vehicle side to an igniter side, for example, a diode or a varistor (a non-linear resistance element) as the noise countermeasure circuit (a circuit for preventing an igniter from being activated erroneously), the above-described erroneous activation of the igniter can be prevented.

Further in each of the above inventions, preferably, the integrated circuit has a discharging waveform converting circuit which converts a signal waveform of a current, for igniting the priming, stored in the capacitor for each igniter.

The discharging waveform converting circuit has a function for converting the discharging waveform represented by the following formula (I) to a triangular waveform or a trapezoidal waveform. In addition, in order to provide a similar converting function, a coil can be interposed in a connecting circuit between the capacitor and the heat generating portion, and the discharging wave form converting circuit can further be provided in the integrated circuit in view of simplification of the entire system.

In the embodiments of the invention, there is provided with a circuit, among the currents from the bus circuit for charging the capacitor and the required information, for charging the capacitor, having a function for rectifying a current to flow into a capacitor to be charged (hereinafter, referred to as a rectifying circuit. Further, it is preferable that a function for amplifying at least one of a rectified voltage for charging a capacitor and a voltage applied to the bus line exists in the rectifying circuit.

The invention provides, as another means for solving the above problem, a method for controlling operation of an air bag system using the above integrated circuit for an air bag system, wherein a time period for supplying a current from the capacitor to the heat generating portion is the time period from the point where a current value reaches the current value corresponding to 5% of the maximum current value to the point where the current value is reduced to the value corresponding to 5% of the maximum current value, which is within 500 μsec. In this case, the maximum current value in the period for supplying a current is a current value sufficient to ignite the priming.

In the case of a conventional air bag system, since a current for activating an igniter flows from a power source (a battery) with a relatively large capacitance at 1.2 A for about 2 msec, that is, at a relatively low current for a relatively long time, a waveform of an ignition current (a vertical axis denotes a current value (A) and a horizontal axis denotes a time (μsec)) becomes rectangular.

In the present invention, however, since a current for activating an igniter is supplied from a capacitor with a relatively small capacitance, it is preferable that a relatively high current flows for a short time, because ignition of the igniter is made smoother and ignition energy itself can be made smaller. The waveform of the ignition current at this time (a vertical axis denotes a current value (A) and a horizontal axis denotes a time (μsec)) becomes a discharging waveform expressed by the following formula (I) when discharging starts at a time of time t=0:

$$i(t)=(V0/R) \times e^{-t/CR} \quad (I)$$

(In the formula, V0 represents a capacitor charging voltage (V), R represents a circuit resistance (Ω), C represents a capacitor capacitance (μF), t represents a time (μsec), and i represents a current (A)).

When such a discharging waveform expressed by the formula (I) is employed, a current value becomes larger than a conventional rectangular waveform, but a current conduction time is shortened. Therefore, the ignition energy itself is reduced largely.

In the present invention, when a period in which a stable current supply is being maintained after reaching a desired current value is defined as t (μsec), and a period from a start of waveform rising to stopping of current supplying for making the heat generating portion generate a heat is defined as T (μsec), it is preferable that a relationship (t/T) between these t and T is in the range of $0 \leq t/T < 0.2$ or $0.5 < t/T < 1$.

In the case of $0 \leq t/T < 0.2$, a waveform of a current is similar to a discharging waveform (a waveform similar to a triangle) obtained when electricity stored in the capacitor is applied to the heat generating portion directly. In case of $0.5 < t/T < 1$, a waveform of a current is similar to a waveform (a waveform similar to a triangle) obtained when a discharging waveform is converted through a discharging waveform converting circuit for converting a waveform of a current stored in a capacitor to a signal waveform of a current for igniting the priming or the like.

The period for supplying a current is as described above, and it is preferably within 200 μsec, and more preferably within 100 μsec. Incidentally, a current value at this time varies depending on a resistance value of the heat generating portion in the igniter, and it is determined on the basis of presence or absence of the waveform converting circuit, the constitution of the waveform converting circuit, a particle diameter of a priming, a shape of the heat generating portion and the like.

The invention provides, as another means for solving the above problem, a method for controlling operation of an air bag system using the above integrated circuit for an air bag system, wherein a current to the heat generating portion is supplied as an ignition pulse, and the current is supplied such that the width of the ignition pulse becomes 20 to 500 μsec.

In the case of a conventional air bag system, since a current for activating an igniter flows from a power source (a battery) with a capacitance at 1.2 A for about 2 msec, that is, at a relatively low current for a relatively long time, a waveform of an ignition current (a vertical axis denotes a current value (A) and a horizontal axis denotes a time (sec)) becomes rectangular.

Therefore, in the above invention, a current of a relatively high volume is supplied for a relatively short time, namely, a current is supplied such that the width of the ignition pulse is 20 to 500 sec, preferably 30 to 200 sec, and more preferably 40 to 100 μsec. As a result, since an amount of ignition energy required for activating individual igniters can be reduced, the amount of ignition energy required for all the igniters, namely for the entire air bag system can be reduced. For this reason, the capacitance of the capacitor for backup power source incorporated into the ECU can be made smaller, and accordingly, the ECU itself can be reduced in size.

In the above invention, it is preferable, in view of reduction of the amount of a current, that a current is supplied such that the width of the ignition pulse becomes 40 to 100 μsec.

According to the air bag system employing the present invention, the weight of the entire air bag system can remarkably be reduced by using the bus system and an operation performance similar to the conventional one can be ensured.

DETAILED DESCRIPTION OF THE PRESENT INVENTION

An air bag system of the present invention achieves reduction in weight of the entire system by using a bus line and achieves reliability of an operation of the system by the above-described solving means. Embodiments including the above-described solving means will be explained below.

(1) First Embodiment

Figure 1:
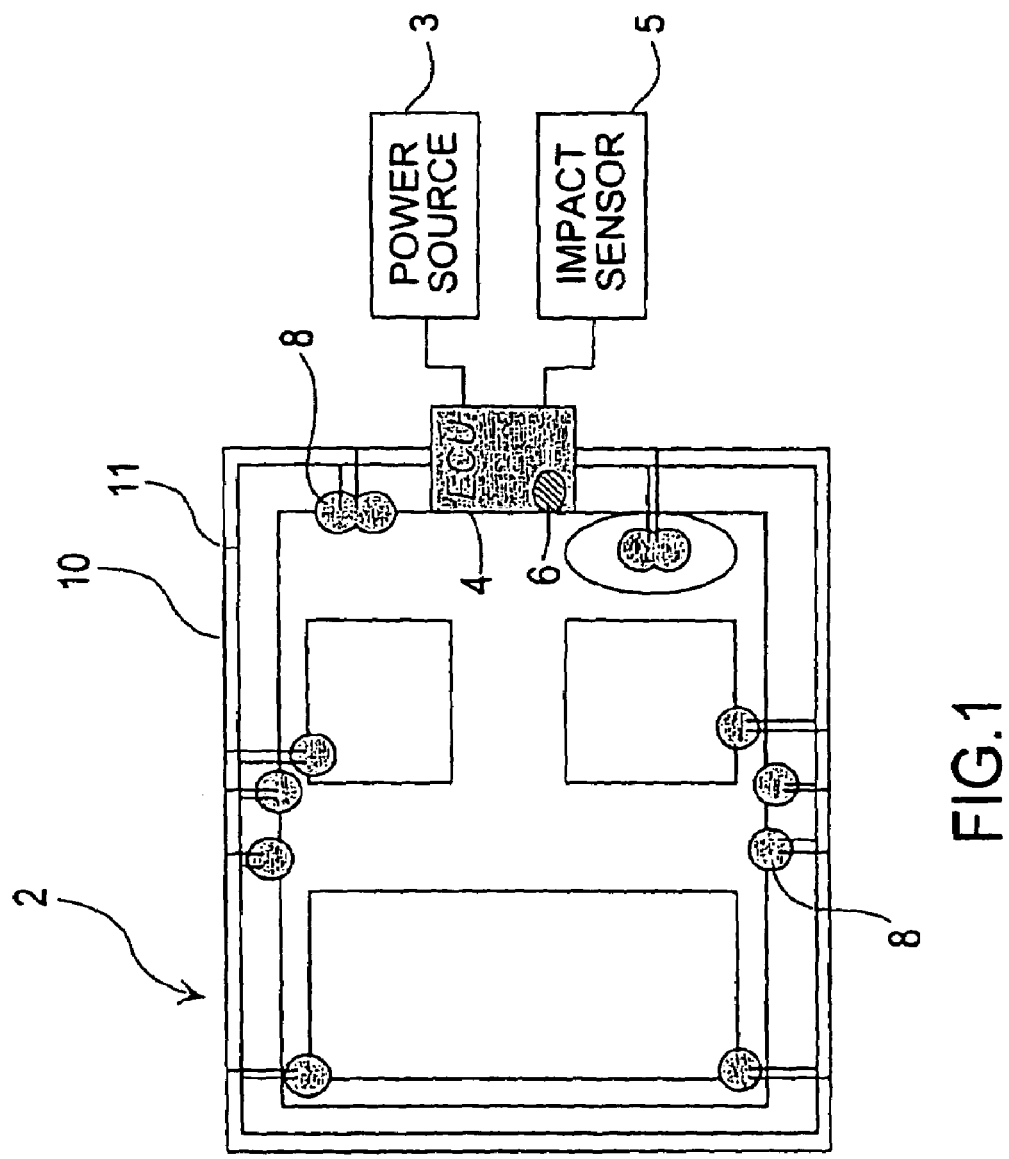
FIG. 1 is a diagram of an air bag system employing the present invention.
Figure 13:
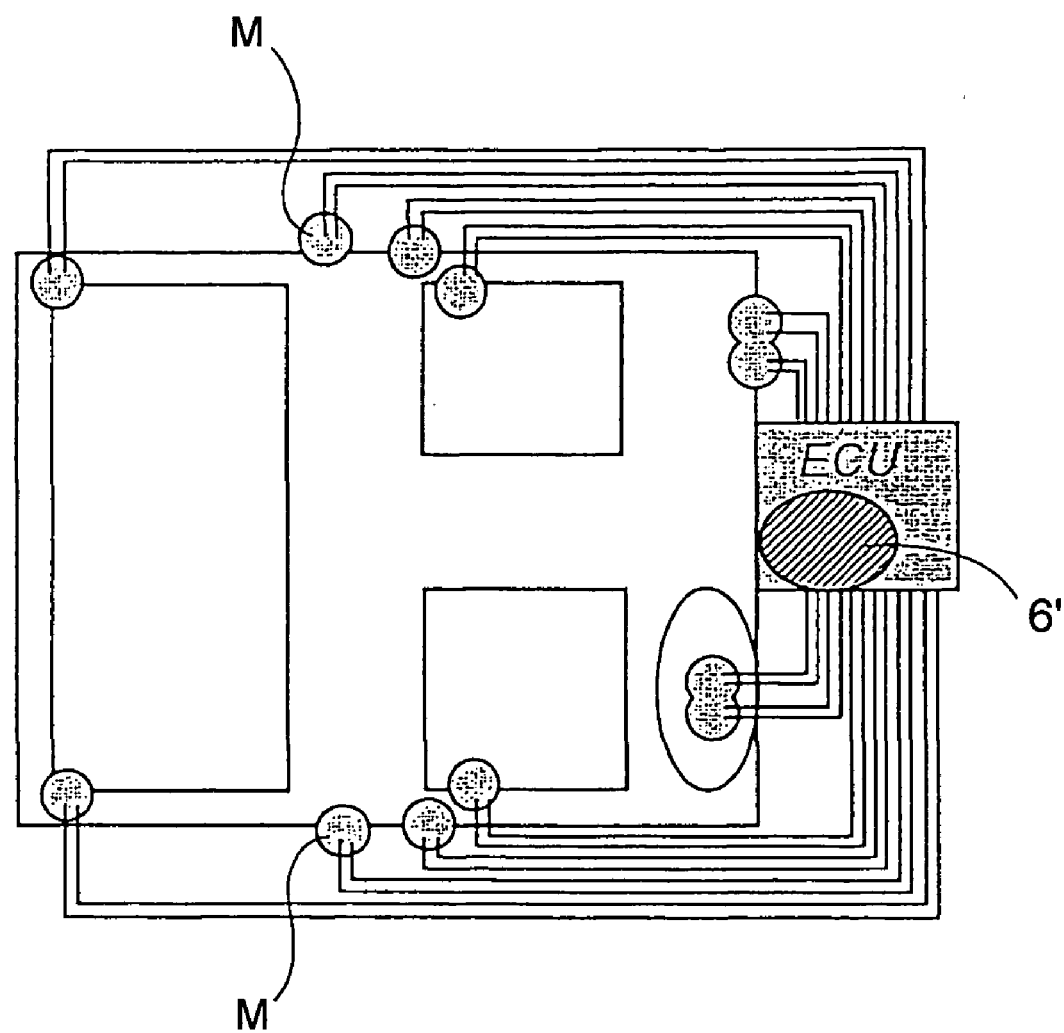
FIG. 13 is a diagram of a conventional air bag system.
Figure 14:
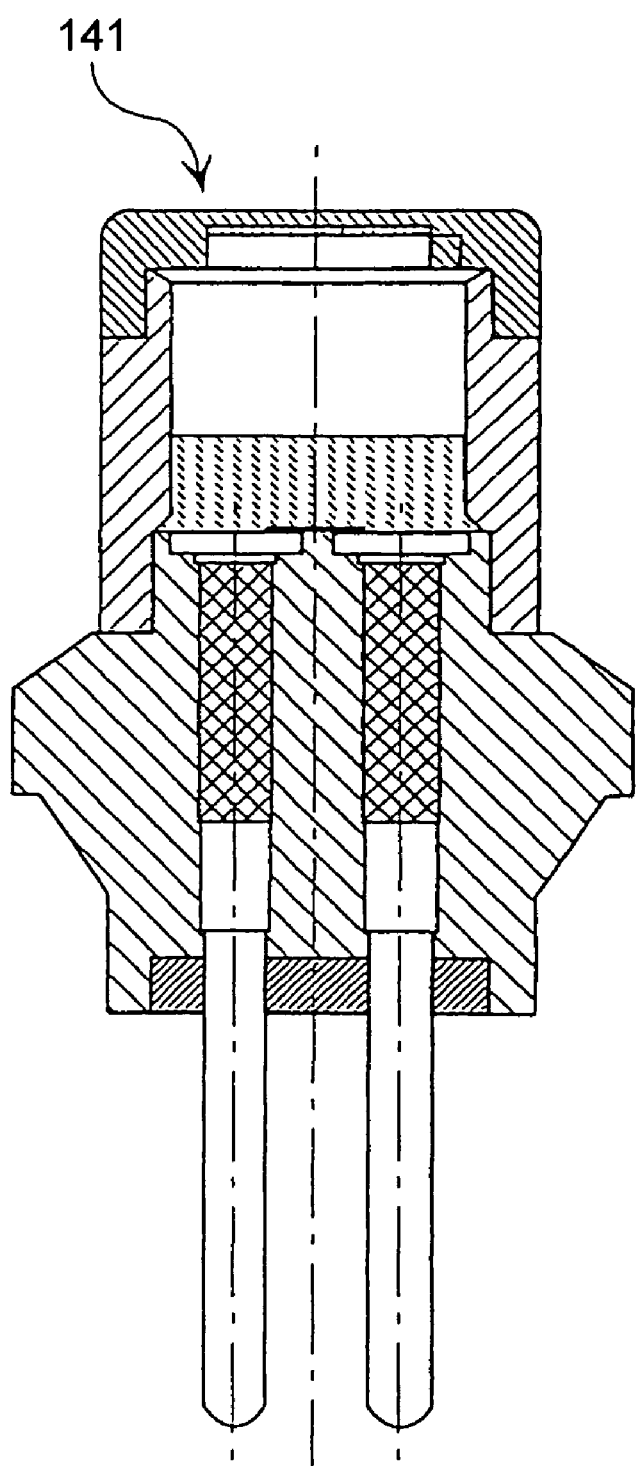
FIG. 14 is a vertical sectional view of an igniter used in the conventional air bag system.

As shown in FIG. 1, an air bag system 2 employing the present invention uses bus lines 10 and 11 comprising two loop wires passing through an ECU 4. The ECU 4 is connected to a power source 3 (a battery in a vehicle) and an impact detecting sensor 5, and a capacitor 6 for backup, when a conductor connecting the ECU and the power source is disconnected by an impact at a collision of a vehicle, is disposed. Incidentally, in the air bag system employing the present invention, since a capacitor is disposed in each of respective gas generators (igniters), the capacitor 6 for backup may be one with a small capacitance (i.e., light weight), but the capacitor 6' serving for backup in the conventional air bag system shown in FIG. 13 has to have a large capacitance in order to activate all the gas generators at a time of disconnection of a lead wire between the battery and the ECU.

Gas generators in a required number of module cases 8 (which are indicated by black circles. The gas generator and an air bag are accommodated in module case 8.) mounted to a vehicle are connected to the bus lines 10 and 11 to be actuated, by two conductors (or three or more conductors when occasion demands).

Figure 2:
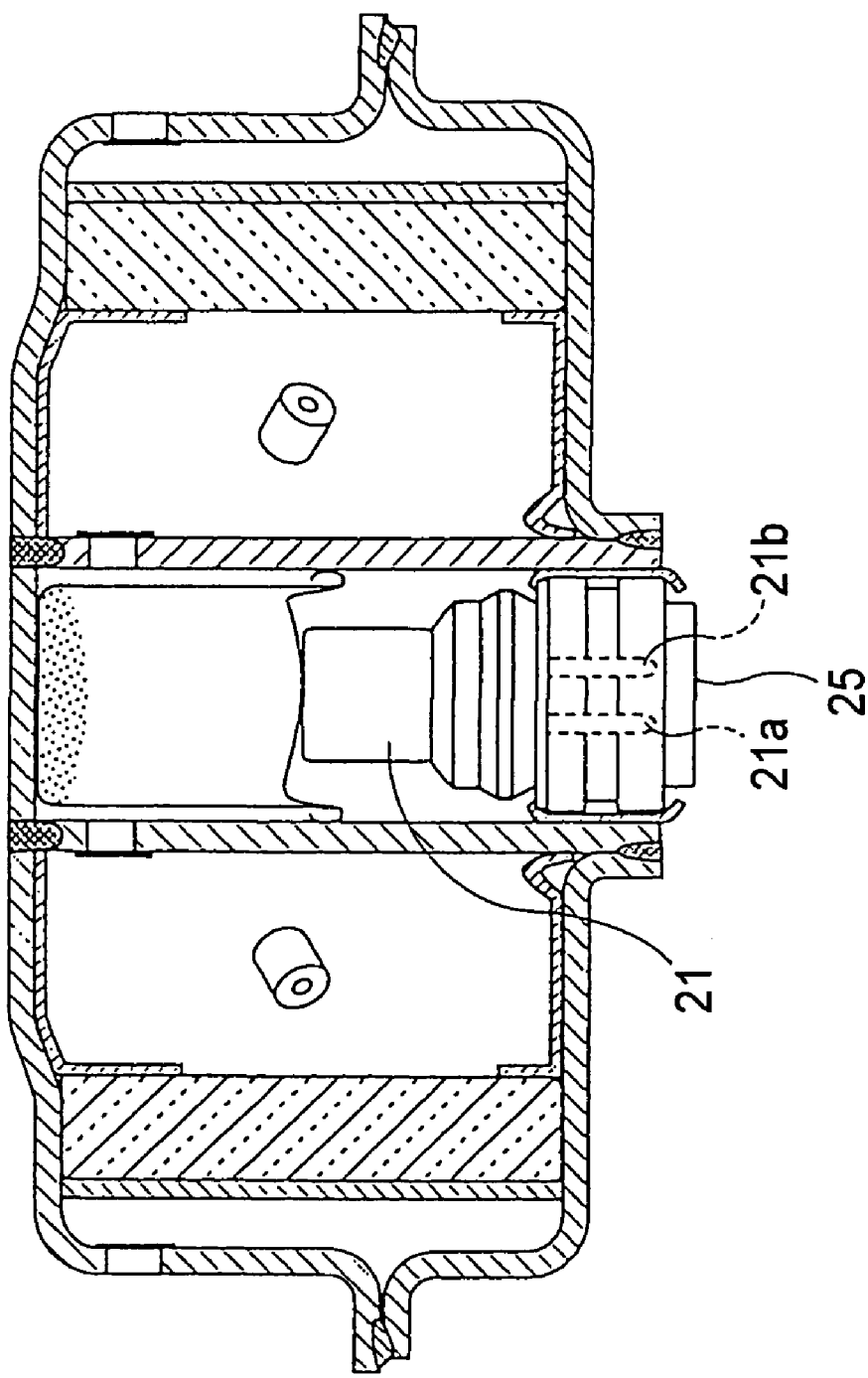
FIG. 2 is an axial sectional view of a gas generator (including one igniter) used in the air bag system employing the present invention.
Figure 3:
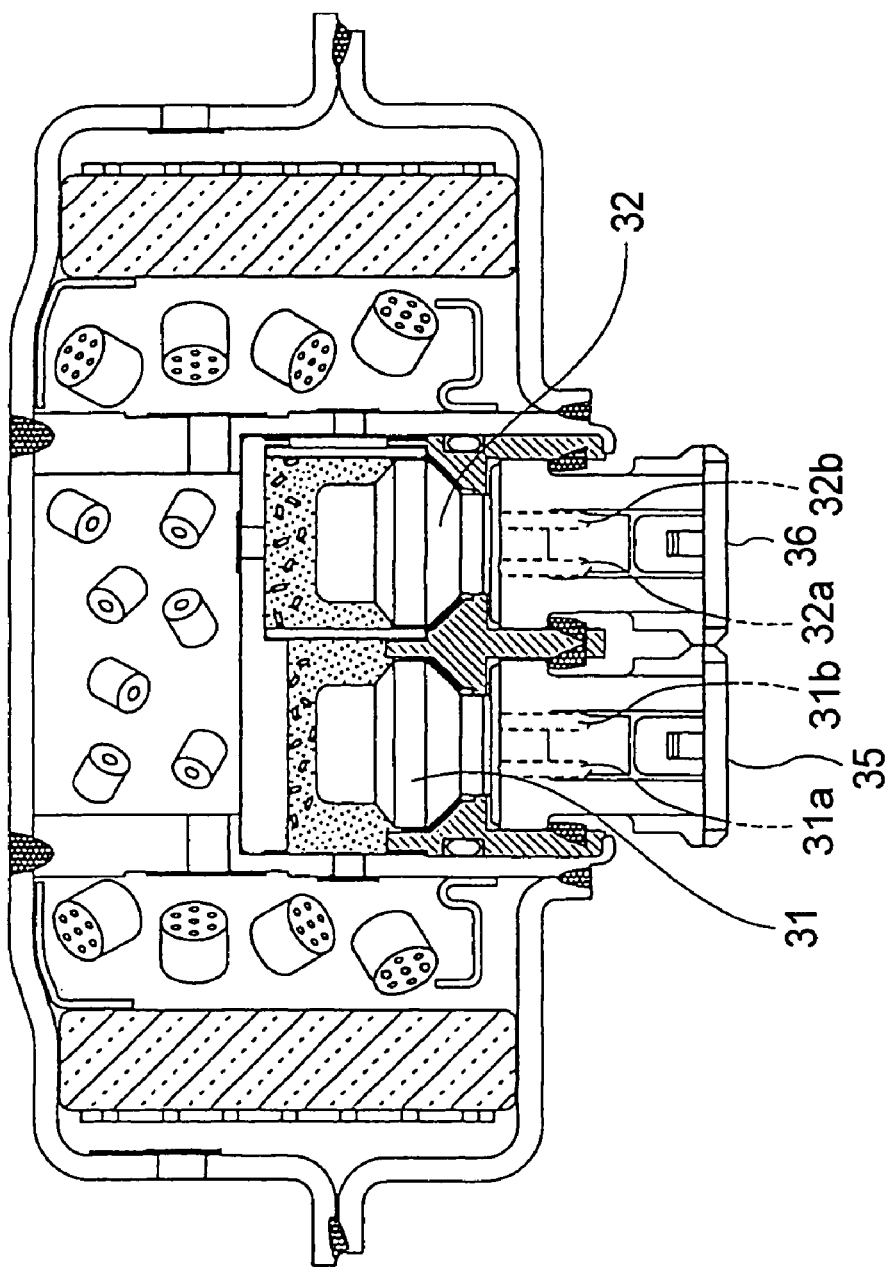
FIG. 3 is an axial sectional view of a gas generator (including two igniters) used in the air bag system employing the present invention.

As the gas generators in the module cases 8, ones shown in FIG. 2 or FIG. 3 can be used according to the number of the igniters. FIG. 2 is an axial sectional view of a single type gas generator (in which one igniter is provided, and FIG. 3 is an axial sectional view of a dual type gas generator (in which two igniters 32 and 32 are provided.

In the single type gas generator, two (or three or more when occasion demands) pins 21a and 21b are provided in the igniter 21 and they are connected to the bus lines 10 and 11 through a connector 25.

In the dual type gas generator, two (or three or more when occasion demands) pins 31a and 31b are provided in an igniter 31, two (or three or more when occasion demands) pins 32a and 32b are provided in an igniter 32, and the igniters are respectively connected to the bus lines 10 and 11 through respective connectors 35 and 36.

Figure 4:
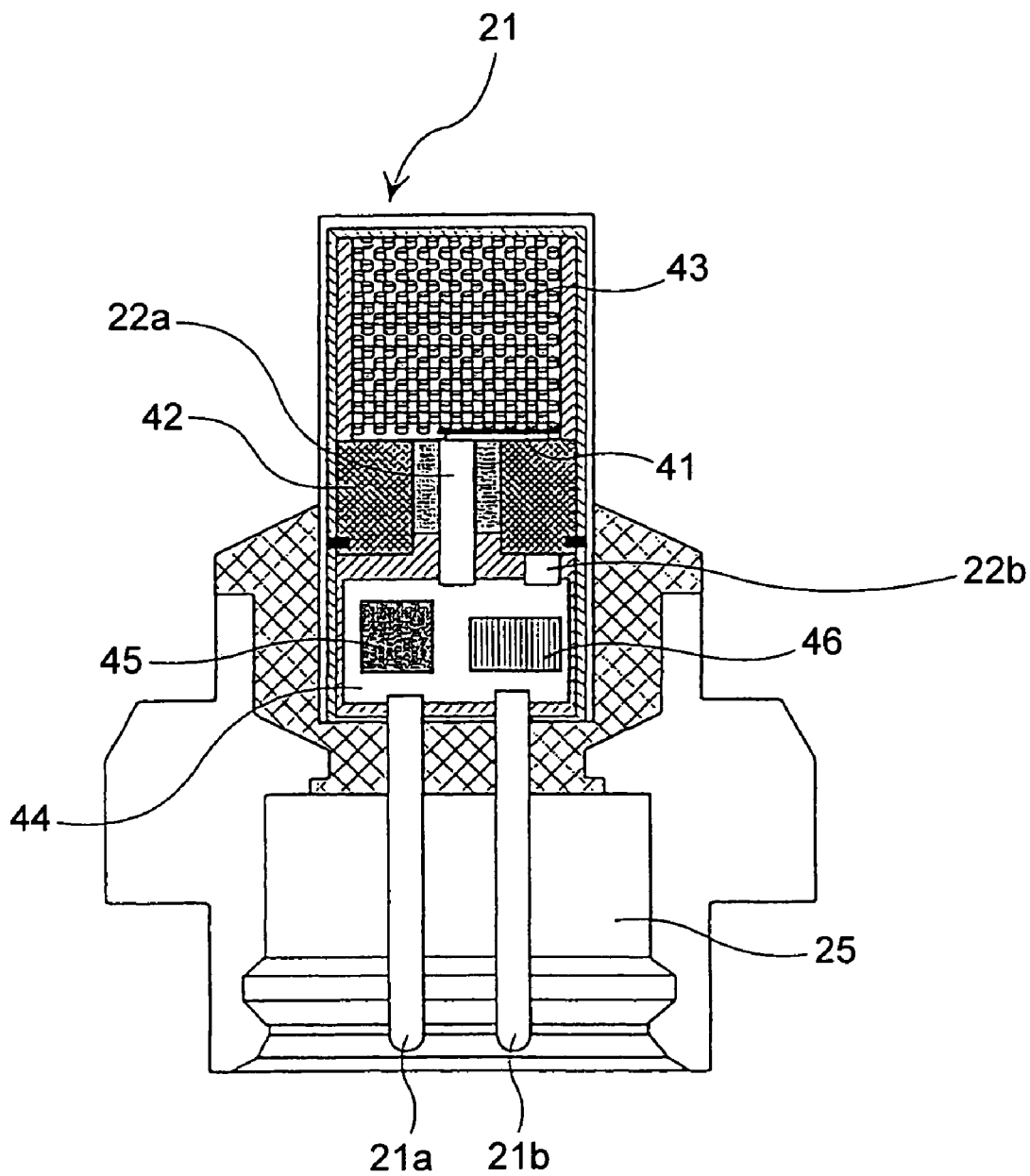
FIG. 4 is a vertical sectional view of an igniter used in the air bag system employing the present invention.

As the igniter 21 and the igniters 31 and 32 provided in the gas generators shown in FIG. 2 and FIG. 3, for example, one shown in FIG. 4 can be used. FIG. 4 shows a vertical schematic sectional view of the igniters. Since an igniter having the same structure can be used as the igniter 21 and igniters 31 and 32, the igniter 21 will be explained below.

A heat generating portion 41 provided on a glass header 42, an igniting agent 43 (for example, ZPP) is charged to come in pressure-contact with the heat generating portion 41 and a substrate 44 provided with a capacitor 45 and an integrated circuit 46 in which information for developing required functions has been recorded is disposed in a lower portion of the igniter 21. The integrated circuit 46, and the heat generating portion portion 41 and the capacitor 45 are respectively connected by two conductors, and the integrated circuit is further connected to the pins 21a and 21b through conductors.

The integrated circuit 46 is recorded with information to inflate a required air bag when a command is received from the ECU 4 at least upon a collision of a vehicle. In addition, information for executing at least one, when required, for example, selected from the group of functions for detecting abnormality of the heat generating portion of the igniter in the gas generator, identifying each of the plural gas generators, and detecting a malfunction of the capacitor can be recorded in the integrated circuit. A current for discharging the capacitor flows via a rectifying circuit 57 (see FIG. 5).

In each invention described above, the details of the circuit having the function for detecting abnormality of the heat generating portion of the igniter in the gas generator, the circuit having the function for identifying each of the plural gas generators, and the circuit having the function for detecting a malfunction of the capacitor are described in the following items (i) to (iii).

(i) The circuit having the function for detecting abnormality (disconnection or contact failure between the heat generating portion and the priming, or abnormality of a resistance value of the heat generating portion) of the heat generating portion of the igniter in the gas generator:

As one of conditions required for the gas generator to activate normally, a contacting state between the heat generating portion of the igniter and the priming has to be good (the heat generating portion and the priming has to be brought in press-contact with each other). For example, when there is a gap between the heat generating portion and the priming, it is considered that there occurs a malfunction such that the priming may not be ignited when the igniter is actuated or an ignition is delayed. Further, when the heat generating portion is disconnected or have been half-disconnected, a similar malfunction occurs. For this reason, by recording information for detecting the malfunction in the integrated circuit, an inferior product can be removed at a time of shipping, and by detecting abnormality at a practical use (while driving a vehicle), a prompt exchange can be performed.

Detecting theory for abnormality of the heat generating portion (Thermal Transient Test; issued on pages 461 to 478 in "Progress of International Pyrotechnic Seminar" on July 1980 by A. C. Munger) is as follows: when contacting state of a heat generating portion and a priming is good, most of the heat generated by flowing of a constant current is conducted to the priming, so that the temperature of the heat generating portion does not rise so high. On the other hand, when the contacting state of the heat generating portion and the priming is bad, transfer of heat is less, so that the temperature rising of the heat generating portion becomes higher than in a normal case. Therefore, a malfunction is detected by detecting a temperature change due to such a difference in contacting state as a resistance value change and utilizing a temperature coefficient of metal resistance $[r=r0\ (1+\alpha\Delta T)]$ to obtain the temperature of the heat generating portion. More specifically, after a resistance r is measured when a current i which is too weak to raise the temperature up to igniting the igniter, a resistance R is measured when a current I of 10 to 15 times of the current i is flowed (the temperature of the heat generating portion becomes about 50 to 100° C., but the priming is not ignited with such a temperature), so that the resistance change due to the temperature change of the heat generating portion is obtained as a voltage change with comparisons of I and i and of R and r. Thus, such measurement information is recorded in the integrated circuit.

(ii) The function for identifying each gas generator among a plurality of gas generators:

For the gas generator for an air bag, various kinds of gas generators such as one for a driver side, one for a passenger side, one for a side impact (for a side collision), one for a curtain air bag and the like have been practically used. For example, in the case of the gas generator for a side impact, the total four gas generators are mounted for a driver side, a passenger side, two rear seat sides respectively. For this reason, though different information pieces are recorded in the respective integrated circuits of the gas generators for the driver side, for the passenger side next to the driver, and for two rear seat sides, when these information pieces are recorded at a time of assembling the igniters or the gas generators or before assembling, since the igniters or the gas generators have the same appearance, it is necessary to distinguish the gas generators having the same appearance and having different information pieces recorded or the igniters having the same appearance before assembling such that a wrong gas generator is not taken to store and to transport them, which becomes much complicated. Furthermore, if a gas generator for a driver side is mistakenly mounted to a vehicle as a gas generator for a passenger side, when activation information of an air bag for a driver side is sent from the ECU, an erroneous activation of an air bag for the passenger side would occur.

Therefore, by recording information for identifying each of the plurality of gas generators after one of assembling of gas generators (when differences of gas generators can be recognized apparently), after gas generators are assembled in module cases (when differences of module cases can be recognized apparently) and after gas generators are mounted to a vehicle, storage, transportation, management and the like of gas generators can be made easy, so that mistake or confusion is prevented from occurring at a time of mounting of gas generators.

It is preferable that the information for identifying a function for each gas generator among the plurality of gas generators are recorded after assembling the gas generators. It is more preferable that the information pieces are recorded after the gas generators are assembled in the module cases, and it is further preferable that the information pieces are recorded after the module cases are mounted to a vehicle.

(iii) The function for detecting a malfunction of the capacitor:

The information necessary for detecting a malfunction of the capacitor also includes confirmation information of a mounted state (soldered state) of a capacitor to a substrate and the like in addition to information for measuring a pulse response or a dielectric dissipation factor.

After mounted to the vehicle, since the capacitor repeats charging and discharging, the capacitor deteriorates with age. However, abnormality is detected at a time of an actual use (while driving a vehicle) by recording information which can determine a malfunction due to this deterioration in the integrated circuit in advance, so that a prompt exchange can be performed. Furthermore, by recording information for confirming the soldered state in advance, an inferior product can be removed at a time of shipping.

Figure 5:
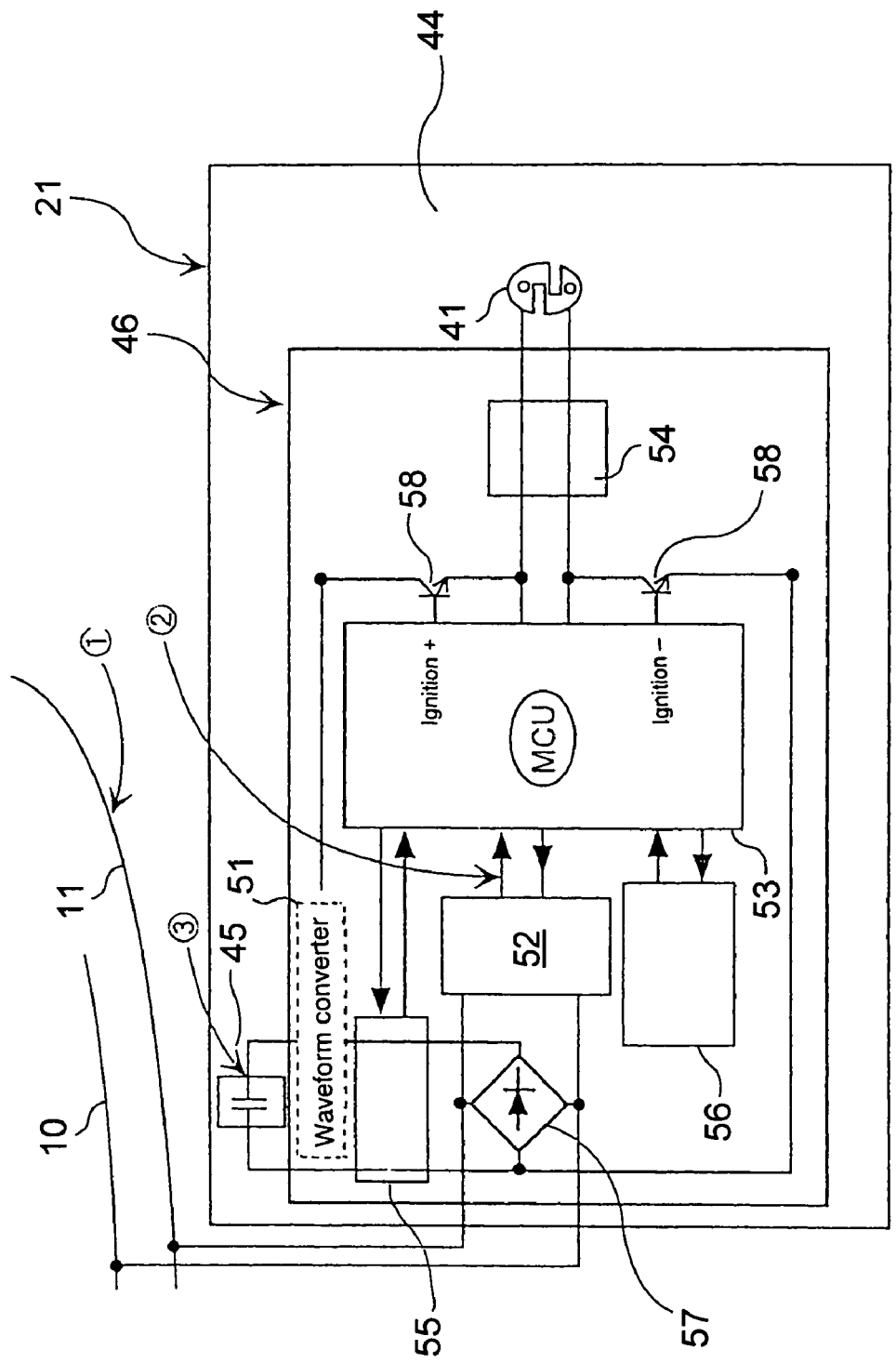
FIG. 5 is a conceptual diagram of an igniter used in the air bag system of the present invention.
Figure 6:
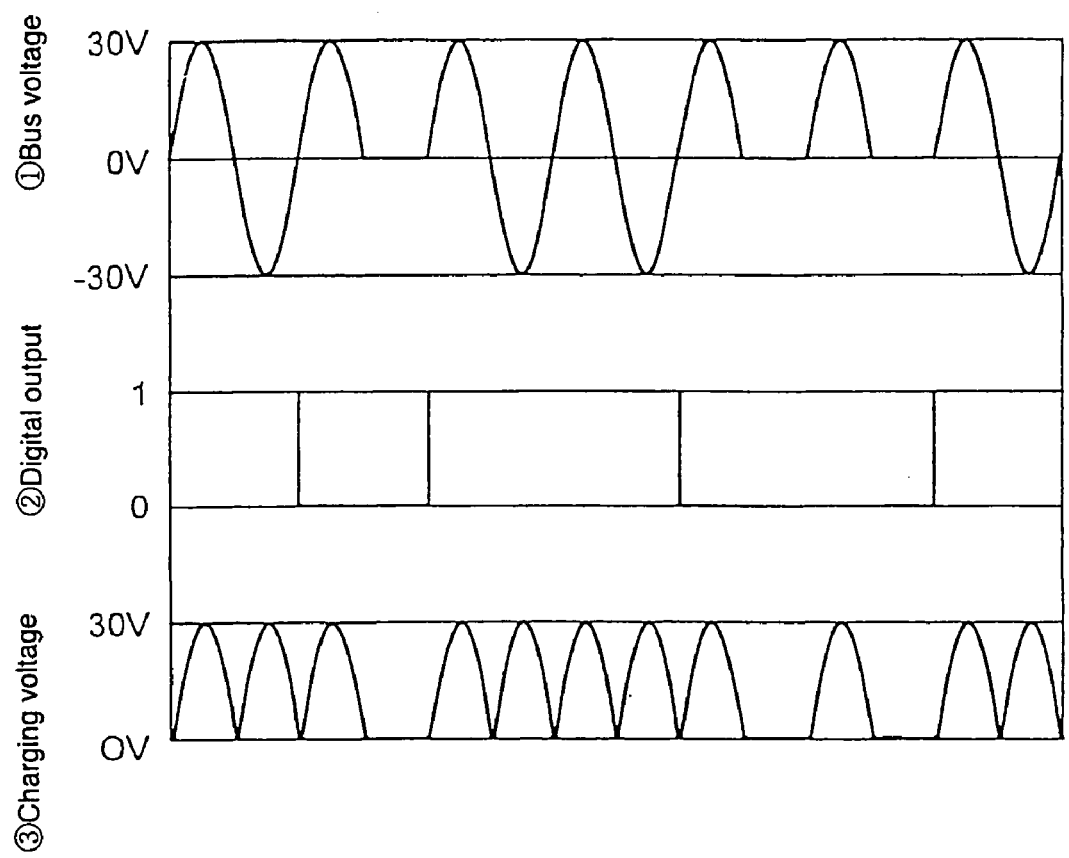
FIG. 6 is a pulse waveform diagram of a bus voltage, a digital output and a charging voltage shown in FIG. 5.

The substrate 44 in the igniter 21, as shown in FIG. 4, that is provided with the capacitor or the integrated circuit 46 may be constituted to have each of structures shown with the conceptual diagrams in FIG. 5. Incidentally, FIG. 6 shows pulse waveforms of a bus voltage ①, a digital output ②, and a charging voltage ③ shown in FIG. 5.

The capacitor 45 and the integrated circuit 46 are provided on the substrate 44, a discharging waveform converting circuit 51 (shown as a "waveform converter") can be provided thereon, if required, and the discharging waveform converting circuit itself can be incorporated into the integrated 44 circuit 46.

The integrated circuit 46 and the capacitor 45 on the substrate are connected to the bus lines 10 and 11 through the pins 21a and 21b. After a current and information supplied from the bus lines 10 and 11 are sent to the integrated circuit 46 they are converted to digital outputs by an A/D converter 52 (an analog/digital converter) to be sent to an MCU 53 (a MicroComputerUnit). Thereafter, a command is sent from the MCU such that charge control information, stored in a charging control 55, for monitoring charging of power source, position identification information, stored in a position information ROM 56, for determining ignition position, disconnection-detecting information of a heat generating portion or a resistance value change detecting information is exhibited. Further, the current is used for charging the capacitor 45, but it is not used for making the heat generating portion 41 generate heat.

A varistor (non-linear resistance element) is disposed in a circuit between the MCU and the heat generating portion as noise preventing means 54, and it serves such that the igniter 21 is not activated erroneously due to a noise generated outside the igniter 21.

The heat generating portion 41 is put in contact with the priming, and it generates heat by a current supplied only from the capacitor 45 to ignite the priming 43.

Next, an operation of the air bag system employing the present invention and a method of controlling operation of the air bag system will be explained with reference to FIG. 1, FIG. 5, and the like.

When a vehicle is running normally, disconnection-detecting information or resistance value change detecting information of the heat generating portion 41, detecting information for a malfunction of the capacitor 45, and detecting information about whether or not an igniter including an identifying function required for activating a gas generator 21 (detecting information about whether or not an igniter having an identification function for activating a gas generator required for a driver side, a passenger side or the like properly at a time of collision is disposed rightly, or whether or not another igniter having the same identifying function is disposed in a duplicated manner) is sent from the ECU 4 to the gas generator 21 (the integrated circuit arranged in the igniter) through the bus lines so that whether or not there is abnormality in these members is checked. When there is an abnormality, an alarm lamp activated in linkage with the air bag system, or the like informs the abnormality, so that an early exchange of parts can be conducted to recover the safety. Further, the capacitor of each igniter can be charged from the power source.

When a vehicle provided with the air bag system collides, information from the impact detecting sensor is sent to the ECU 4, and information from ECU 4 is sent, via the bus lines 10 and 11, to a gas generator 21 (the integrated circuit provided in the igniter) required to inflate an air bag for ensuring a safety for a vehicle occupant.

Upon receiving this information, a required current is supplied from the capacitor 4 for a predetermined time period (from the point where a current value reaches the current value corresponding to 5% of the maximum current value to the point where the current value is reduced to 5% of the maximum current value which is only within 500 μsec), and the heat generating portion generates heat to ignite and burn the priming. At this time, the waveform of the current forms a discharging waveform represented by the formula (I) when a discharging starts at a time t=0. By igniting and burning the priming, a transfer charge in FIG. 2 or FIG. 3 and further the gas generating agent are ignited and burnt to generate a gas. The gas is discharged from gas discharging ports to inflate an air bag accommodated in the module case together with the gas generator.

(2) Second Embodiment

An air bag system of this embodiment has a substrate on which the integrated circuit and the like is arranged, a structure for determining a state of the disposition or the like.

First, a structure of a substrate will be explained. As shown in FIG. 5, a capacitor, an integrated circuit recorded with information to exhibit required functions, and a heat generating portion are provided on the substrate, and these members can be arranged on one surface or both surfaces of the substrate.

Figure 7:
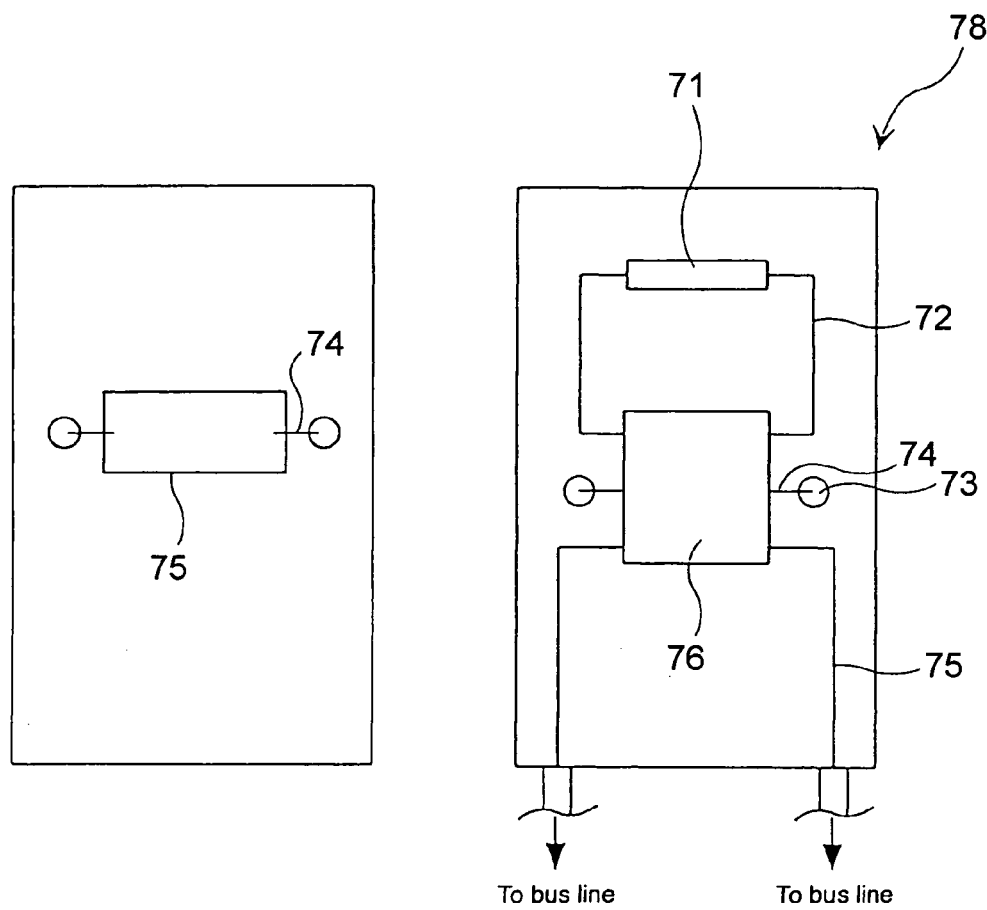
FIG. 7 is a plan view of both surfaces of a substrate (respective elements are arranged on both surfaces) provided in an igniter used in the air bag system employing the present invention.

As shown in FIG. 7, such a structure can be employed that an integrated circuit 76 and a heat generating portion 71 are provided on one surface of a substrate 78, and a capacitor 75 is provided on the other surface. When this structure is employed, the capacitor 75 and the integrated circuit 76 are connected through two conductors 74 inserted into two holes 73, and the integrated circuit 76 and the heat generating portion 71 are connected through two conductors 72. The integrated circuit 76 is also connected to the bus lines 10 and 11 through two conductors 75, pins of the igniters or the like.

Figure 8:
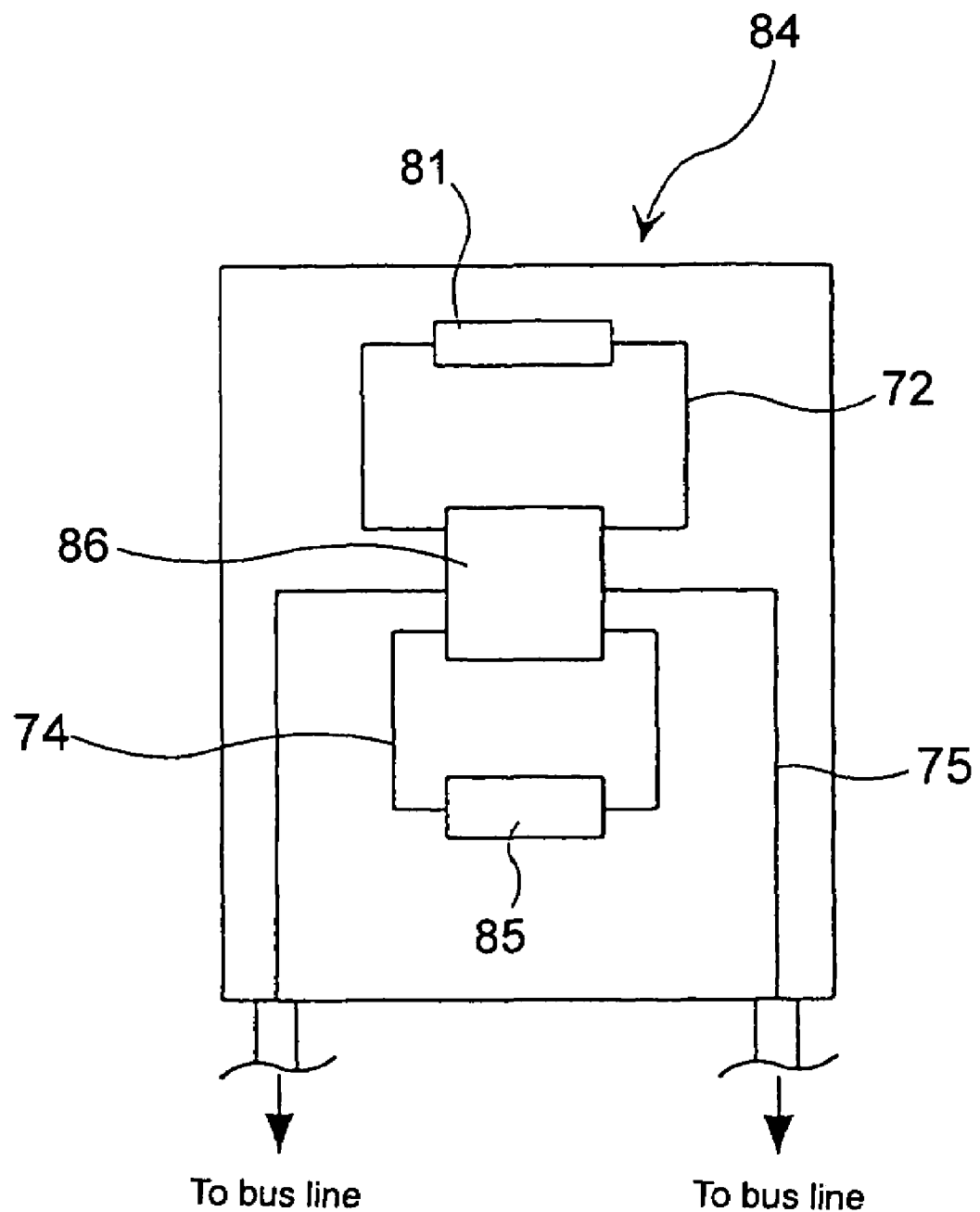
FIG. 8 is a front view of a substrate (respective elements are arranged on one surface) provided in an igniter used in the air bag system employing the present invention.

As shown in FIG. 8, such a structure can be employed that an integrated circuit 86, a heat generating portion 81 and a capacitor 85 are arranged on a single surface of a substrate 84. The integrated circuit 86, the capacitor 85, and the heat generating portion 81 are connected by two conductors 74 and 72, respectively, and the integrated circuit 86 is also connected to the bus lines 10 and 11 through two conductors 75, pins of the igniters or the like.

Figure 9:
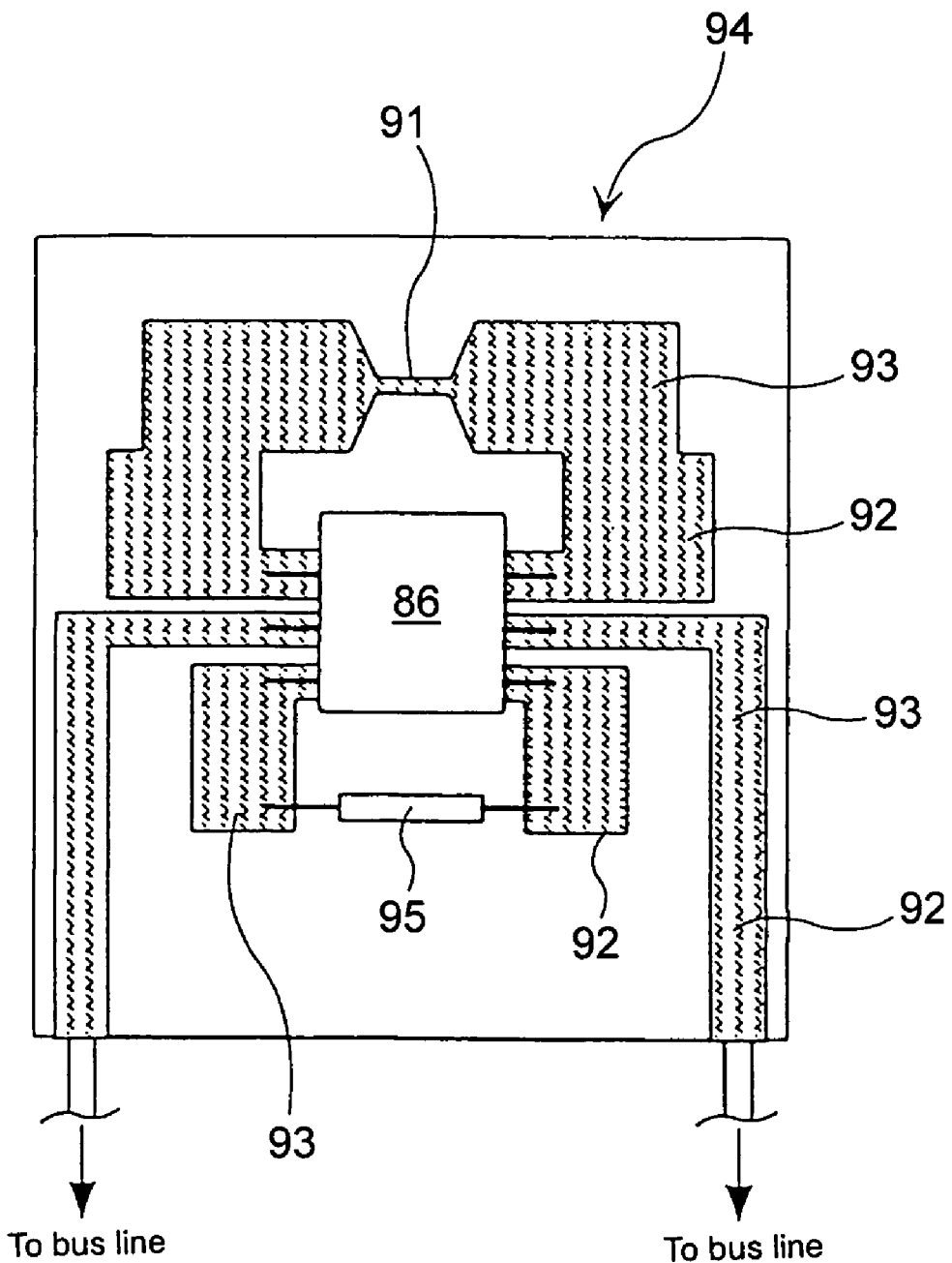
FIG. 9 is a front view of another embodiment of a substrate (respective elements are arranged on one surface) provided in an igniter used in the air bag system employing the present invention.

An electroconductive pattern is formed on a substrate 94 by etching, as shown in FIG. 9, including connecting portions 92 which connect the integrated circuit with a heat generating portion 91 the capacitor 95, and the bus lines. By using a conductor pattern 93 by such etching, connecting respective elements is performed more easily.

Figure 10:
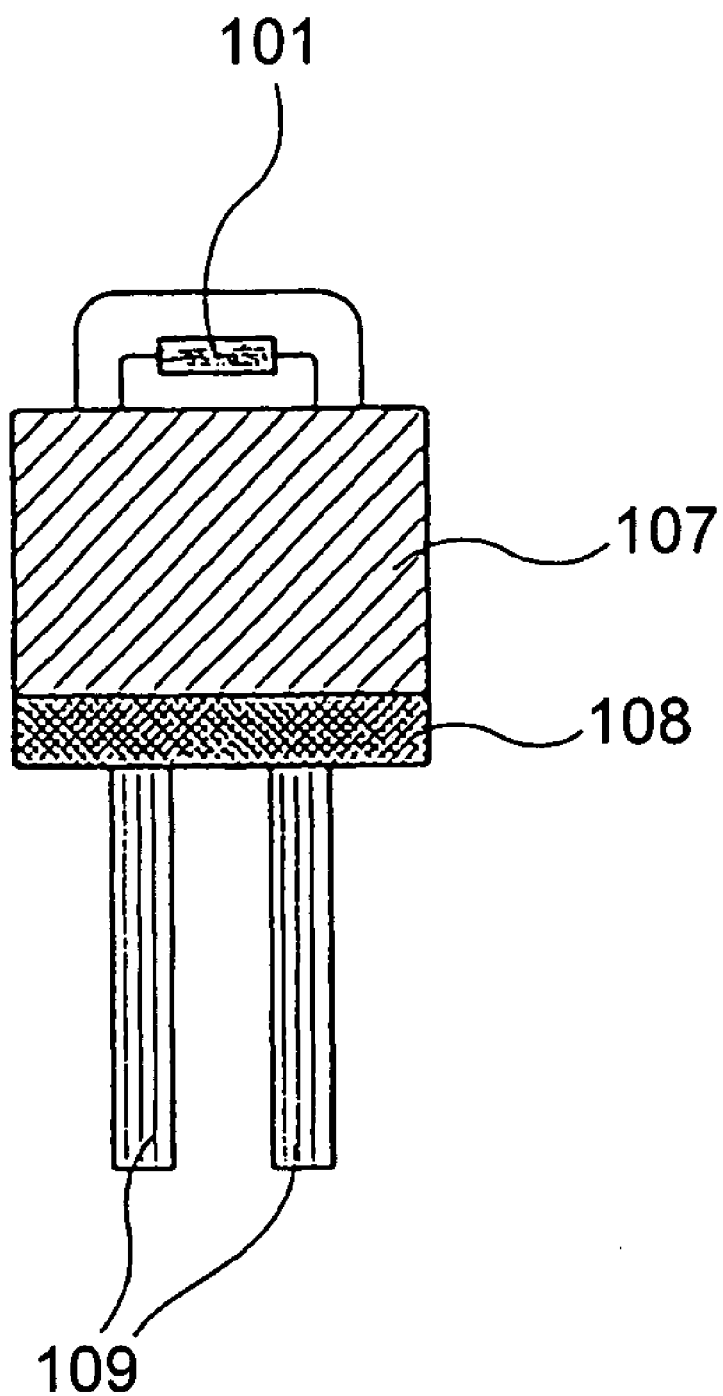
FIG. 10 is a front view of a substrate provided in an igniter used in the air bag system employing the present invention and sealed with insulating material.

As shown in FIG. 10, when a portion of the substrate except for a heat generating portion 101 is covered and sealed with an insulating material 107 such as epoxy resin, the sealing resin serves as a protection film for the integrated circuit or the capacitor, which is preferable. In FIG. 10, the substrate shown in FIG. 7 is used, but the substrate shown in FIG. 9 can be also used. The substrate is provided to stand on a glass header 108, from which pins 109 extend.

Next, the disposing state of the substrate will be explained with reference to FIG. 11. A substrate 114 used in FIG. 11 is shown in FIG. 10, but, in the drawing, a priming 113 covering a heat generating portion 111 is omitted, and a sealed portion 115 of an insulating material is partially cut out.

Figure 11:
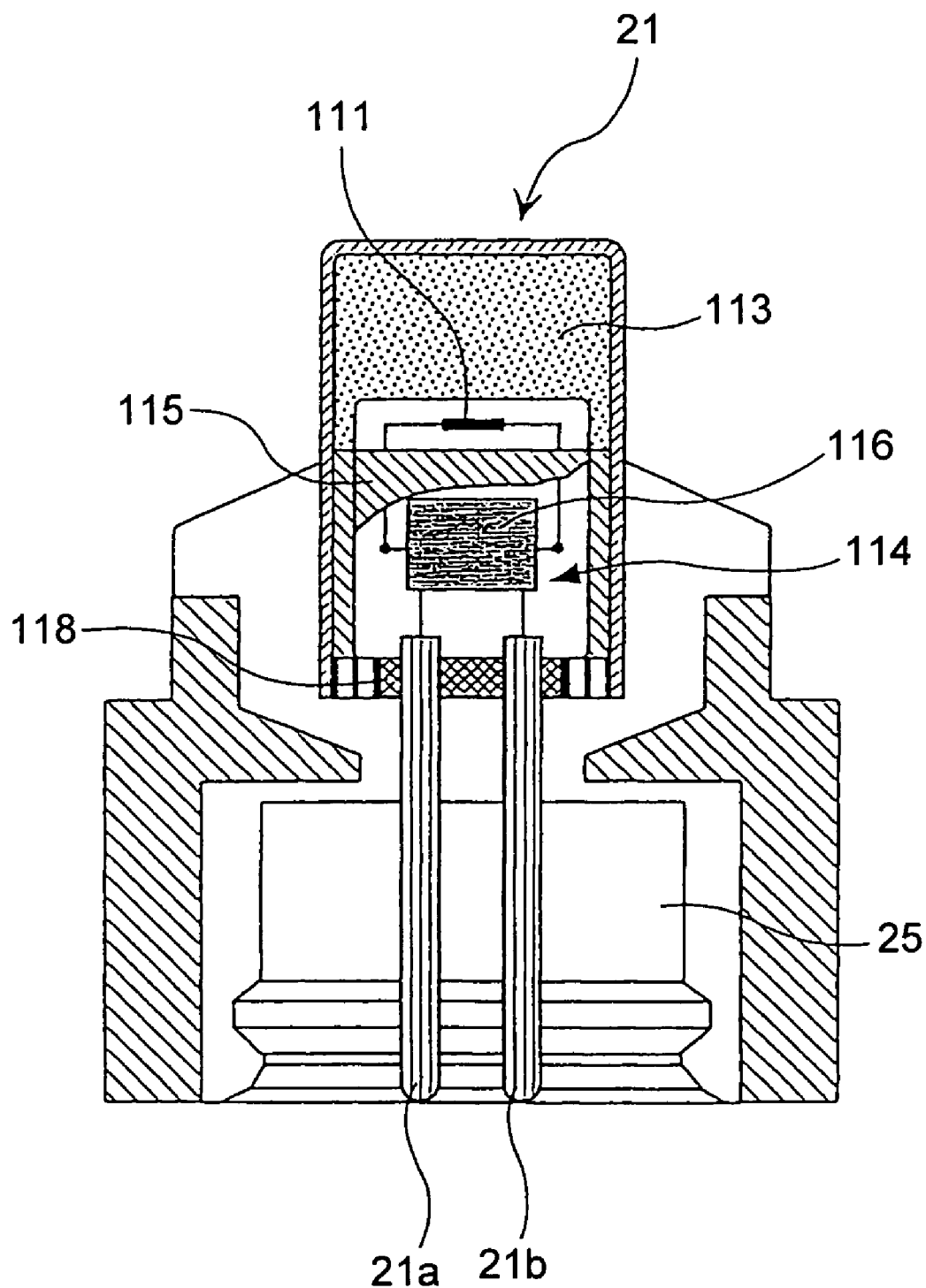
FIG. 11 is a vertical sectional view of another embodiment of an igniter used in the air bag system employing the present invention.

As shown in FIG. 11, since the substrate shown in FIG. 10 is used as the substrate 114 in the igniter 21 (having a different shape from the shape shown in FIG. 4), the substrate 114 is provided to stand on a header 118 a portion of the substrate 14 except for the heat generating portion 111 is covered with insulating material such as epoxy resin, and the heat generating portion 111 comes in contact with the priming 113. Contacting surfaces of a substrate bottom surface and the header 113 are fixed by adhesive.

By providing the substrate 114 on the header 118 vertically in this manner, a space capacity for disposing the substrate 114 can be made smaller than in a case of laying the substrate, so that the igniter itself can be reduced in size. Then, since an integrated circuit 116 and a capacitor on the portion of the substrate 114 except for the heat generating portion 111 do not come in contact with the priming 113, contamination thereof or the like are prevented.

Further, in the igniter 21 shown in FIG. 4, a glass header 42 is provided between the substrate 44 and the priming 43, and the substrate 44 arranged with the capacitor 45 and the integrated circuit 46 is provided below the header 42 vertically. Then, the heat generating portion is disposed above the header 42 (on a surface of the header), and the heat generating portion 41 and the substrate 44 are connected by conductors (two pins 21a and 21b). The heat generating portion is formed by employing a method for welding a wire for heat generation on the header 42 to fix the heat generating portion, or the like.

In the embodiment shown in FIG. 4, also, the integrated circuit 46, the capacitor 45 and the pins 21a and 21b can be connected by a conductor pattern obtained by etching, and the heat generating portion 41 and the integrated circuit 46 can be connected by a conductor pattern obtained by etching.

As described above, by providing the substrate below the header vertically, a space capacity for disposing the substrate can be made smaller than a case of laying the substrate, so that the igniter itself can be reduce in size. Moreover, since the substrate and the priming do not come in contact with each other, contamination of the integrated circuit or the capacitor or the like can be prevented.

The air bag system of the second embodiment operates like the air bag system of the first embodiment.

(3) Third to Fifth Embodiments

As shown in FIG. 5, the capacitor 45, the integrated circuit 46 recorded with information to exhibit a function for detecting abnormality of the heat generating portion 41 in the igniter 21, and the heat generating portion 41 of the igniter 21 are disposed on a substrate 44. The information includes disconnection of the heat generating portion 41 a loose contact between the heat generating portion 41 and a priming, abnormality of a resistance value of the heat generating portion 41 and the like.

Since abnormality such as disconnection, a loose contact between the heat generating portion 41 and the priming or the like can be detected rapidly by recording the above information in the integrated circuit, early exchange of parts can be performed to improve reliability of the system and safety of a vehicle occupant.

As shown in FIG. 5, the capacitor 45, the integrated circuit recorded with information to exhibit an function for identifying each of the plural gas generators, and the heat generating portion 41 of the igniter are disposed on the substrate. Preferably, the information to exhibit the above-described identifying function is recorded after the gas generator is assembled, after the gas generator is disposed into a module case, or after the module case is mounted in a vehicle.

By recording the above information of the identifying function in the integrated circuit in this manner, not only such management as storage, transportation or the like of a product is facilitated but also an erroneous activation such that an air bag is inflated differently from a command from the ECU is prevented in an actual use, so that reliability of the system and safety of a vehicle occupant can be improved.

As shown in FIG. 5, the capacitor 45, the integrated circuit 46 recorded with information to exhibit a function for detecting a malfunction of the capacitor 45 and the heat generating portion 41 of the igniter 21 are provided on the substrate 44. The information includes information for measuring a pulse response or dielectric dissipation factor.

By recording the above information in the integrated circuit 46, a malfunction of the capacitor 45 can rapidly be detected, so that prompt exchange of parts can be performed to improve reliability of the system and safety of a vehicle occupant.

In the above-described third to fifth embodiments, a current required for exhibiting each recorded information is supplied from the power source (a battery in a vehicle) to the integrated circuit via the bus lines 10 and 11 and the two pins 21a and 21b of the igniter 21, and a command for exhibiting the recorded information from the ECU is also transmitted to the integrated circuit via the same path as the current. Then, the air bag systems of the third to fifth embodiments operate like the air bag system of the first embodiment.

(4) Sixth Embodiment

Figure 12:
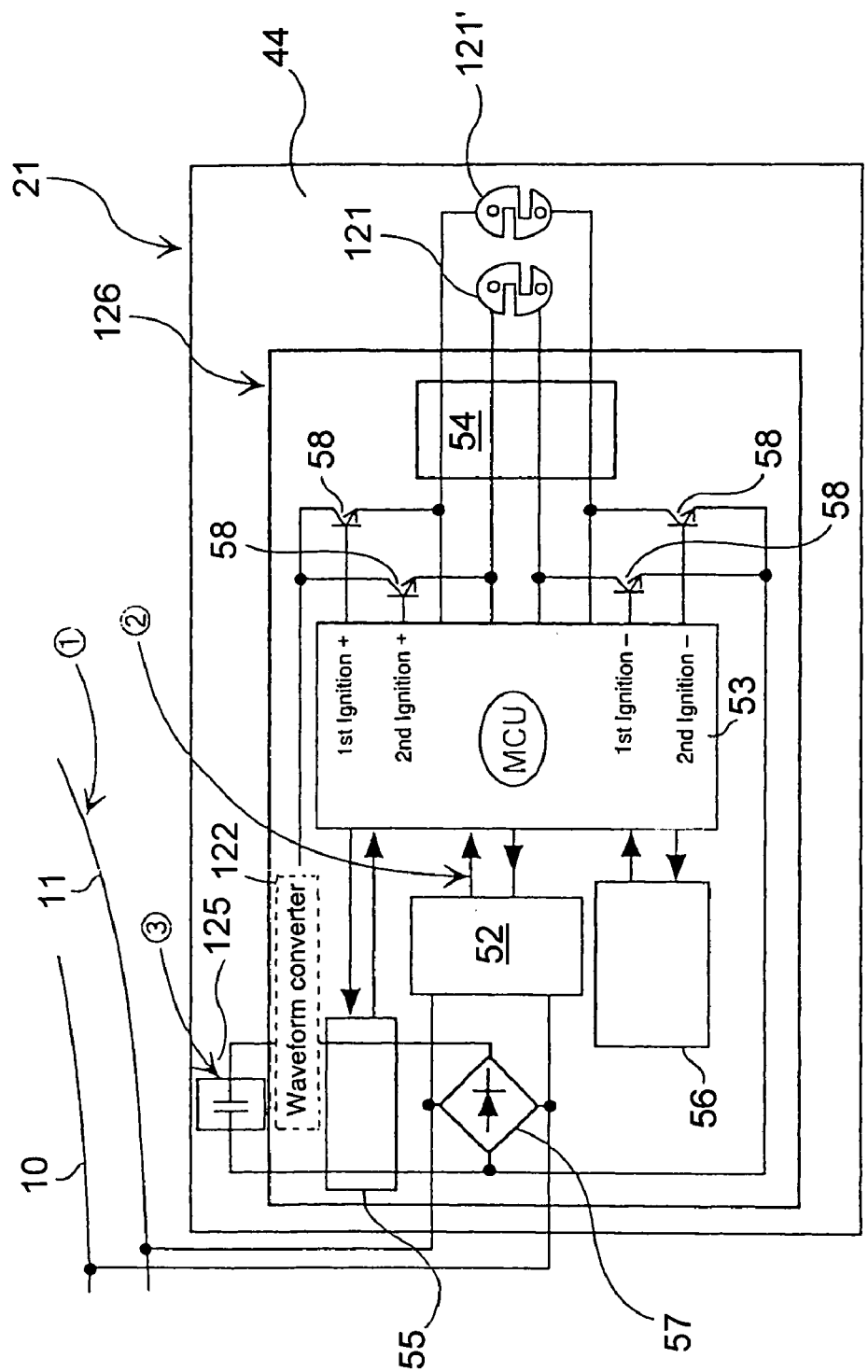
FIG. 12 is a vertical sectional view of another embodiment of an igniter used in the air bag system of the present invention.

In FIG. 12, in a gas generator having two igniters, two heat generating portions 121, 121' one capacitor 125, and an integrated circuit 126, in which information for executing required functions has been, are provided, and a discharging waveform converting circuit 122 is also provided, if required.

When the gas generator has two igniters 31, 32, as shown in FIG. 3, three operation aspects such that a case of activating only either one of the igniters, a case of first activating one of the igniters and then activating the other with a slight delay, and a case of simultaneously activating the two igniters are considered according to a collision state of a vehicle, and, the integrated circuit 126 of the igniter shown in FIG. 12 is recorded with such information to make two heat generating portions 121, 121' generate heat according to each of the above-described three instruction from the ECU. Other elements of the integrated circuit 126 are substantially identical to those shown in FIG. 5. Therefore, the same reference numerals have been provided and a detailed explanation thereof has been omitted.

The igniters 31 and 32 of the gas generator shown in FIG. 3 can be made to have the structures shown in FIG. 5 or in FIG. 12.

The air bag system of the sixth embodiment also operates like the air bag system of the first embodiment, and it operates in response to the above-described three command contents.

(5) Seventh Embodiment

A method for controlling operation of an air bag system in which an integrated circuit for an air bag system of the present invention is incorporated will be explained with reference to FIG. 1 to FIG. 5, and FIG. 12.

When a vehicle is running normally, a weak current for disconnection detection in the heat generating portions is fed from the MCU to the igniters of the gas generators, and abnormality in the portions is detected, if any. Then, when abnormality is detected, an alarm lamp or the like actuated in linkage with the air bag system informs the occupant of the abnormality. Therefore, early exchange of parts can be conducted so that safety can be ensured. Further, a current component is caused to flow from the bus line along with the required information for charging the capacitor.

When the vehicle provided with the air bag system has collided, information from the impact detecting sensor is sent to the ECU, and the integrated circuit further receives the information sent from the ECU to develop the required functions.

As shown in FIG. 5 (or FIG. 12), a switch circuit (a transistor) 58 for shutting off current when it is unnecessary to actuate the igniter and for starting current supply at a time of actuation of the igniter is provided in the integrated circuit. When the switch circuit 58 is opened, a current stored in the capacitor does not flow into the heat generating portion.

By feeding a control pulse instructing opening or closing of the switch circuit 58 from the MCU, the switch circuit 58 is opened or closed. The instruction of the control pulse transmission to the pulse generator is sent from the MCU upon receiving a command from the impact detecting sensor.

If the switch circuit is applied with, for example, a current pulse with a waveform width of 100 μsec from the MCU, the switch is closed for 100 μsec and it allows a current from the capacitor to flow in the heat generating portion of the igniter as a pulse with a width of 100 μsec. That is, the switch circuit closes a switch while a current (a control pulse) is flowing in the switch circuit 58 like in a case of using a thyristor, a MOS-FET, or a bipolar transistor as the switch circuit. In this manner, by applying a pulse with a predetermined time width (20 to 500 μsec) to the heat generating portion of the igniter, the heat generating portion is caused to generate heat with a required igniting energy to ignite and burn the priming.

The transfer charge in the gas generator shown in FIG. 2 or FIG. 3, and further the gas generating agent are ignited and burnt by ignition and combustion of the priming to generate a gas, and the generated gas is discharged from the gas discharging port to inflate the air bag accommodated in the module case together with the gas generator.

By using such an integrated circuit for an air bag system, an amount of the current (ignition energy amount) required for actuating individual igniters normally is reduced, so that an amount of a current (ignition energy amount) required for actuating all the igniters normally is also reduced. As a result, the capacitance (namely, weight) of the capacitor for backup power source can also be reduced, and the ECU itself can be made smaller. For this reason, the weight of the entire air bag system can be reduced.

The integrated circuit for an air bag system of the present invention can be applied as an integrated circuit provided in the igniter incorporated into various inflators (gas generators) such as an inflator for an air bag for a driver side, an inflator for an air bag for a passenger side, an inflator for a side air bag, an inflator for a curtain air bag, an inflator for a knee-bolster air bag, an inflator for an inflatable seat belt, an inflator for a tubular system, and an inflator for a pretensioner.

The invention claimed is:

1. An air bag system provided with a plurality of gas generators, comprising:
    an electronic control unit connected to a power source and an impact detecting sensor;
    bus lines including a plurality of loop wires which pass through the electronic control unit, the loop wires supplying and transmitting currents and information; and a plurality of igniters operationally connected to the bus lines at predetermined portions of the bus lines, said plurality of igniters including an igniter provided with a heat generating portion, a priming in contact with the heat generating portion, an integrated circuit, and a capacitor through which a current is supplied to the heat generating portion for igniting the priming, wherein, the current from the capacitor is supplied to the heat generating portion for a time period starting from a point where the current reaches a value corresponding to 5% of the maximum current value to a point where the current reduces to a value corresponding to 5% of the maximum current value, which is within 500 μsec.

2. The air bag system according to claim 1, wherein, when a waveform of the current supplied to the heat generating portion from the capacitor starts discharging at a time of time t=0, the waveform is a discharging waveform expressed by the following formula (I):

$$i(t)=(V0/R)\times e^{-t/CR} \quad (I)$$

where, v0 represents a capacitor charging voltage (V), R represents a circuit resistance (Ω), C represents a capacitor capacitance (μF), t represents a time (μsec), and i represents a current (A).

3. The air bag system according to claim 1 or 2, wherein, when a period in which a supply of a stable current is being maintained after reaching a desired current value is defined as t (μsec) and a period from a rise of waveform to a stop of a current supply for making the heat generating portion generate heat is defined as T (μsec), said t and T (t/T) satisfy one of $0 \leq t/T < 0.2$ and $0.5 < t/T < 1$.

4. An air bag system provided with a plurality of gas generators, comprising:
an electronic control unit connected to a power source and an impact detecting sensor;
bus lines including a plurality of loop wires which pass through the electronic control unit, the loop wires supplying and transmitting currents and information; and
a plurality of igniters operationally connected to the bus lines at predetermined portions of the bus lines, each of the plurality of igniters being provided with a heat generating portion, a priming in contact with the heat generating portion, an integrated circuit, a capacitor, through which a current is supplied to the heat generating portion for igniting the priming, the integrated circuit detecting abnormality of the heat generating portion, the abnormality including at least one of a disconnection, a loose contact between the heat generating portion and the priming, and abnormality of a resistance value of the heat generating portion, said each of the plurality of igniters further including a discharging waveform converting circuit which converts a signal waveform of the current, for igniting the priming, stored in the capacitor.

5. An air bag system provided with a plurality of gas generators, comprising:
an electronic control unit connected to a power source and an impact detecting sensor;
bus lines including a plurality of loop wires which pass through the electronic control unit, the loop wires supplying and transmitting currents and information; and
a plurality of igniters operationally connected to the bus lines at predetermined portions of the bus lines, each of the plurality of igniters being provided with a heat generating portion, a priming in contact with the heat generating portion, an integrated circuit, a capacitor through which a current is supplied to the heat generating portion for igniting the priming, and a discharging waveform converting circuit which converts a signal waveform of the current, for igniting the priming, stored in the capacitor.

6. An air bag system provided with a plurality of gas generators, comprising:
an electronic control unit connected to a power source and an impact detecting sensor;
bus lines including a plurality of loop wires which pass through the electronic control unit, the loop wires supplying and transmitting currents and information; and
a plurality of igniters operationally connected to the bus lines at predetermined portions of the bus lines, said plurality of igniters including an igniter provided with a substrate, a heat generating portion and a priming in contact with the heat generating portion, and an integrated circuit that detects abnormality of the heat generating portion, the abnormality including at least one of a disconnection, a loose contact between the heat generating portion and the priming, and abnormality of a resistance value of the heat generating portion, the heat generating portion, the integrated circuit, and a capacitor, through which current is supplied to the heat generating portion for igniting the priming, being mounted directly on a single surface of the substrate,
wherein the integrated circuit is disposed between the heat generating portion and the capacitor.

7. The air bag system according to claim 6, wherein a loose contact between the heat generating portion and the priming in the igniter is detected by detecting a change in a resistance value of the heat generating portion indicative of a temperature change in the heat generating portion.

8. An air bag system provided with a plurality of gas generators, comprising:
an electronic control unit connected to a power source and an impact detecting sensor;
bus lines including a plurality of loop wires which pass through the electronic control unit, the loop wires supplying and transmitting currents and information; and
a plurality of igniters operationally connected to the bus lines at predetermined portions of the bus lines, said plurality of igniters including an igniter provided with a substrate, a heat generating portion and a priming in contact with the heat generating portion, and including an integrated circuit that stores information used by the electronic control unit to identify respective gas generators, the heat generating portion, the integrated circuit, and the capacitor being mounted directly on a single surface of the substrate,
wherein the integrated circuit is disposed between the heat generating portion and the capacitor.

9. The air bag system according to claim 8, wherein the information used by the electronic control unit is stored after assembling a gas generator.

10. The air bag system according to claim 8, wherein the information used by the electronic control unit is stored after one of assembling a gas generator in a module case and after mounting the module case into a vehicle.

11. An air bag system provided with a plurality of gas generators, comprising:
an electronic control unit connected to a power source and an impact detecting sensor;

bus lines including a plurality of loop wires which pass through the electronic control unit, the loop wires supplying and transmitting currents and information; and a plurality of igniters operationally connected to the bus lines at predetermined portions of the bus lines, said plurality of igniters including an igniter provided with a substrate, a heat generating portion, a priming in contact with the heat generating portion, an integrated circuit, and a capacitor through which a current is supplied to the heat generating portion for igniting the priming, and detecting a malfunction of the capacitor, the heat generating portion, the integrated circuit, and the capacitor being mounted directly on a single surface of the substrate, wherein the integrated circuit is disposed between the heat generating portion and the capacitor.

12. The air bag system according to claim 11, wherein the malfunction of the capacitor is detected by one of measuring a pulse response and a dielectric dissipation factor.

13. An air bag system provided with a plurality of gas generators, comprising:

an electronic control unit connected to a power source and an impact detecting sensor;

bus lines including a plurality of loop wires which pass through the electronic control unit, the loop wires supplying and transmitting currents and information; and a plurality of igniters operationally connected to the bus lines at predetermined portions of the bus lines, said plurality of igniters including an igniter provided with a substrate, a heat generating portion, a priming in contact with the heat generating portion, an integrated circuit, and a capacitor, through which a current is supplied to the heat generating portion for igniting the priming, the heat generating portion, the integrated circuit, and the capacitor being mounted directly on at least one of surfaces of the substrate, wherein the integrated circuit and the heat generating portion are mounted on a first surface of the substrate, and the capacitor is mounted on a second surface of the substrate opposite to the first surface.

14. The air bag system according to claim 13 or 11, wherein the integrated circuit includes a rectifying circuit for rectifying a current provided by the electronic control unit through the bus lines that flows into the capacitor.

15. The air bag system according to claim 14, wherein the integrated circuit amplifies at least one of a rectified voltage for charging a capacitor and a voltage applied to the bus line.

16. The air bag system according to claim 13 or 6, wherein the integrated circuit includes a circuit for preventing the igniter from being activated erroneously by a noise generated outside the igniter.

17. The air bag system according to claim 13, wherein the heat generating portion, the capacitor, and the integrated circuit are provided on the substrate, and the portion of the substrate except for the heat generating portion is covered with an insulating material.

18. The air bag system according to claim 13, wherein the integrated circuit in the igniter has a function of detecting abnormality of the heat generating portion of the igniter, a function of storing identity of the gas generators, and a function of detecting a malfunction of the capacitor in the igniter.

19. A method for controlling the air bag system as claimed in claim 13 or 18, comprising:

supplying the current to the heat generating portion as an ignition pulse having a width of 20 to 500 µsec.

20. The method according to claim 19, wherein the width is 40 to 100 µsec.

* * * * *